United States Patent [19]
Schisselbauer et al.

[11] Patent Number: 4,950,565
[45] Date of Patent: Aug. 21, 1990

[54] RESERVE ACTIVATED ELECTROCHEMICAL CELL

[75] Inventors: Paul F. Schisselbauer, Southampton, Pa.; Kurt F. Garoutte, Eden Prairie, Minn.

[73] Assignee: Honeywell Inc., Minneapolis, Minn.

[21] Appl. No.: 433,866

[22] Filed: Nov. 9, 1989

[51] Int. Cl.⁵ .......................................... H01M 6/38
[52] U.S. Cl. ..................................... 429/116; 429/118
[58] Field of Search .............. 429/116, 115, 110, 113, 429/118

[56] References Cited

U.S. PATENT DOCUMENTS

| | | | |
|---|---|---|---|
| 2,905,741 | 9/1959 | Smith et al. | 429/116 |
| 2,921,974 | 1/1960 | Mott-Smith | 429/116 |
| 3,100,164 | 8/1963 | Solomon et al. | 429/116 |
| 3,173,812 | 3/1965 | Klein | 429/116 |
| 3,202,548 | 8/1965 | Adlhart et al. | 429/116 |
| 3,298,868 | 1/1967 | Smith et al. | 429/115 |
| 3,674,566 | 7/1972 | Powers | 429/116 |
| 3,743,545 | 7/1973 | Merz et al. | 429/115 |
| 3,930,885 | 1/1976 | Dey | 429/116 |
| 3,990,917 | 11/1976 | Clayman | 429/110 X |
| 4,152,492 | 5/1979 | McCartney et al. | 429/116 |
| 4,446,211 | 5/1984 | Goebel et al. | 429/101 |
| 4,477,540 | 10/1984 | Miller et al. | 429/27 |
| 4,605,604 | 8/1986 | Pollack et al. | 429/116 |
| 4,695,520 | 9/1987 | Koper et al. | 429/116 |
| 4,803,135 | 2/1989 | Garoutte | 429/116 |

Primary Examiner—Anthony Skapars
Attorney, Agent, or Firm—Roger W. Jensen; Mitchell J. Halista

[57] ABSTRACT

A reserve activated electrochemical cell has a sealed electrochemical fluid, e.g., an electrolyte, storage reservoir having an expandable free-floating capsule within the reservoir for selectively pressurizing the fluid. The reservoir is provided with a rupturable diaphragm arranged as a fluid-tight seal across an opening defining a fluid conduit through a wall of the reservoir. The reservoir is formed integrally with a container for a cell electrode assembly or stack, e.g., opposite polarity battery electrodes, with a wall therebetween containing the rupturable diaphragm. A selectively operable gas generator within the reservoir is connected to one end of the expandable capsule for providing a gas pressure therein to expand the capsule. The gas generator is operated by a signal applied to the gas generator by electrical connecting leads passing through fluid-tight seals in a wall of the reservoir. In one embodiment of the present invention, the fluid is an electrolyte, and the fluid control apparatus is used in a reserve activated battery housing to store the electrolyte until it is desired to activate the battery. Energization of the gas generator is effective to expand the free-floating capsule to pressurize the electrolyte and ultimately rupture the diaphragm. The pressurized electrolyte is subsequently delivered through the ruptured diaphragm to the cell stack to activate the battery.

20 Claims, 1 Drawing Sheet

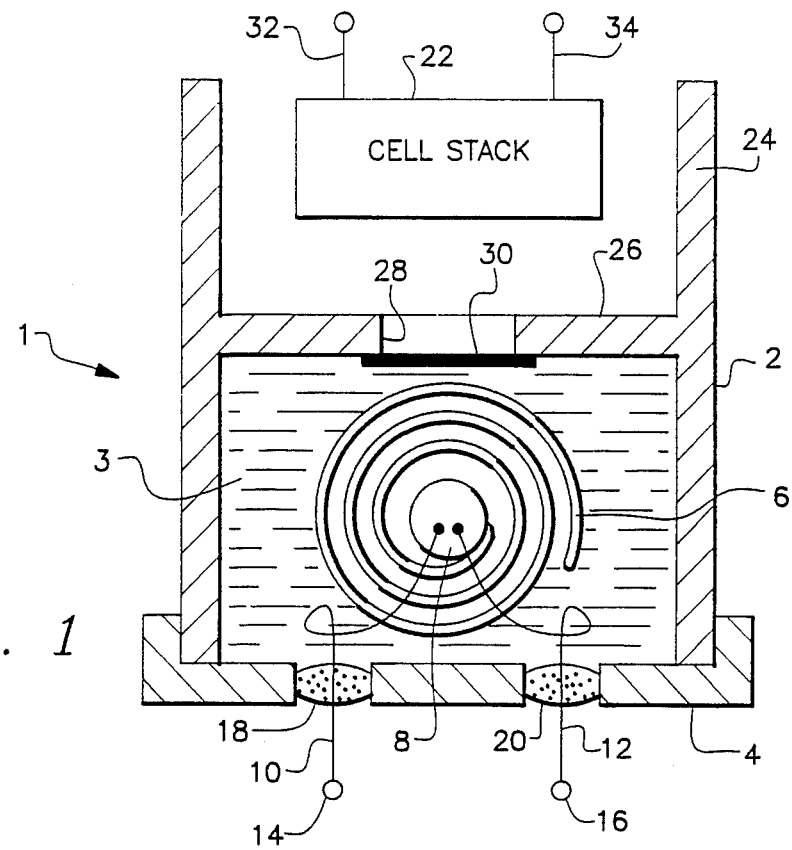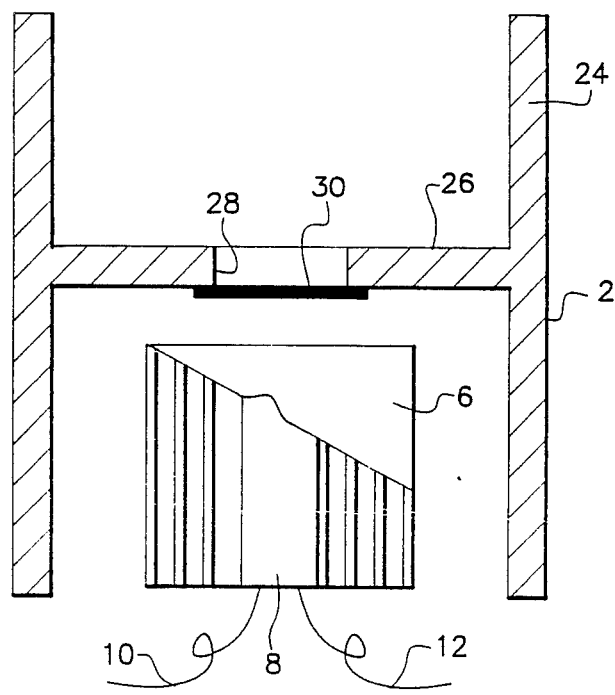

...

RESERVE ACTIVATED ELECTROCHEMICAL CELL

BACKGROUND OF THE INVENTION

Field of the Invention

The present invention relates to a fluid control apparatus. More specifically, the present invention is directed to a reserve activated electrochemical cell.

SUMMARY OF THE INVENTION

An object of the present invention is to provide an improved reserve activated electrochemical cell.

In accomplishing this and other objects, there has been provided, in accordance with the present invention, a reserve activated electrochemical cell including an electrochemical fluid storage reservoir having a fluid conduit through a wall of the reservoir for delivering the fluid from the reservoir and containing an expandable free-floating capsule means, selectively operable means within the reservoir for pressurizing the fluid in the reservoir by an expansion of the capsule means and a selectively rupturable diaphragm means providing a fluid-tight seal across the conduit in the wall of the reservoir for releasing the electrochemical fluid from the reservoir upon a rupture of the seal by a pressurization of the fluid by the capsule means.

BRIEF DESCRIPTION OF THE DRAWINGS

A better understanding of the present invention may be had when the following detailed description is read in connection with the accompanying drawings, in which:

FIG. 1 is a cross-sectional illustration of a first embodiment of the present invention in a reserve activated electrochemical cell shown in an inactive electrochemical fluid storing state and FIG. 2 is a partial cross-section of the cell shown in FIG. 1 illustrating an alternate embodiment of the present invention.

DESCRIPTION OF THE PREFERRED EMBODIMENT

Referring to FIG. 1 in more detail, there is shown an electrochemical cell 1 in an inactive or electrochemical fluid storing state including a fluid reservoir 2 containing an electrochemical fluid 3, e.g., a thionyl chloride electrolyte for a lithium battery. The electrolyte reservoir 2 is closed at one end by a cap 4 forming a fluid-tight seal therewith. An expandable free-floating pressurizable capsule 6 is located within the reservoir 2 to selectively apply pressure to the electrolyte 3. The capsule 6 is shown in FIG. 1 in the form of a hollow spiral tube which is made of a material resistant to the electrolyte, e.g., thick annealed nickel 200. This tube has a wall thickness, e.g., 0.003 inch, to provide flexibility and allow the capsule 6 to expand and to force the electrolyte from the reservoir tube upon an activation of the cell 1, as discussed more specifically hereinafter. One end of the capsule 6 is connected to a gas generator 8 within the reservoir 2. The gas generator 8 may be any suitable gas forming or gas storage and releasing device which is selectively actuable to provide a pressurized gas, such devices being well-known in the art. The gas generator 8 is connected by a pair of electrically conductive wires 10, 12 to external electrical signal terminals 14, 16, respectively, through fluid-tight seals 18, 20 located in the wall of the cap 4. An electrical signal applied to the electrical terminals 14, 16 is, accordingly, effective to energize the gas generator 8 to generate a pressurizing gas for application to the interior of the capsule 6.

A cell stack or assembly 22 comprising a plurality of pairs of opposite plurality electrochemical plates, e.g., lithium battery anodes and cathodes, is located within a fluid-tight cell stack container 24, partially illustrated in FIG. 1. The cell stack container 24 may advantageously be formed as an extension of the electrolyte reservoir 2. An internal wall 26 is arranged to separate the cell stack container 12 from the electrolyte reservoir 2. The wall 26 is provided with a hole 28 extending herethrough to define an electrolyte conduit between the reservoir 2 and the cell stack container 12. The hole 28 is covered by a rupturable diaphragm 30 which is peripherally attached to the wall 26 to form a fluid-tight seal across the hole 28. A first electrical connection to a first polarity electrode within the cell stack 22 is provided by a first electrical connector 32. A second electrical connector 34 is arranged to provide a second electrical connection to a second polarity electrode within the cell stack 22.

The reserve cell 1 illustrated in FIG. 1 is maintained in a dormant state by storing the electrolyte 3 in a separate reservoir 2 isolated from the cell stack 22. The electrolyte reservoir 2 and the electrolyte 3 are pressurized by the expandable capsule 6 which is expanded by a suitable pressurizing gas delivered from the gas generator 8 while maintaining a barrier between the gas and the electrolyte 3. The expansion of the capsule 6 and the consequent pressurization of the electrolyte 3 is ultimately effective to rupture the diaphragm 30 and to propel, or deliver, the electrolyte 3 from the reservoir 2 into the cell stack 22 through the hole 28 to activate the electrochemical cell 1.

While the orientation of the gas generator 8 and the capsule 6 is shown with their common axis parallel to the plane of the rupturable diaphragm 30 in FIG. 1, an alternate orientation is shown in FIG. 2 wherein the common axis of the gas generator 8 and the capsule 6 is shown perpendicular to the plane of the diaphragm 30. The orientation shown in FIG. 2 may have an advantage in allowing expansion of the capsule 6 while minimizing a blockage of the flow of the electrolyte from the reservoir 2 into the cell stack 22 through the hole 28 following a rupture of the diaphragm 30. Additionally, other configurations for the capsule 6 may be employed without departing from the scope of the present invention. For example, the capsule 6 may be in the form of a metal bladder fabricated from a nickel sheet by welding the edges of two sheets together after cutting to a desired bladder shape, e.g., a square or rectangle, and providing an inlet port for connection to the gas generator 8. Additionally, other means of activating the gas generator 8 may be used in place of the direct electrical connections 10, 12 shown in FIGS. 1 and 2, e.g., electromagnetic, magnetic, etc. Such alternate energy transferring schemes being well-known in the art.

Accordingly, it may be seen that there has been provided, in accordance with the present invention an improved reserve activated electrochemical cell.

The embodiments of the present invention in which an exclusive property or privilege is claimed are defined as follows:

1. A reserve activated electrochemical cell comprising an electrochemical fluid storage reservoir having a fluid conduit through a wall of said reservoir for delivering the fluid from said reservoir, an expandable, free-floating capsule means located within said reservoir, an expandable, free-floating capsule means located within said reservoir, selectively operable means within said reservoir for expanding said capsule means to pressurize a fluid within said reservoir, and a selectively rupturable diaphragm means providing a fluid-tight rupturable seal across said conduit in the wall of said reservoir for releasing the electrochemical fluid from said reservoir upon a rupture of said seal by a pressurization of the fluid by said capsule means.

2. An electrochemical cell as set forth in claim 1 wherein said capsule means includes a hollow spiral flexible tube and said selectively operable means includes a gas pressure generator means arranged to selectively introduce a pressurized gas into an interior of said tube to expand said tube to pressurize the fluid.

3. An electrochemical cell as set forth in claim 2 wherein said pressure generator means includes an electrically operable gas generator and a pair of electrical energizing signal connecting leads connected to said gas generator through a wall of said reservoir through respective fluid-tight seals.

4. A reserve activated batter comprising
an electrolyte storage reservoir having a fluid conduit through a wall of said reservoir for delivering the electrolyte from said reservoir, an expandable, free-floating capsule means, selectively-operable means within said reservoir for pressurizing the electrolyte in said reservoir by an expansion of said capsule means, a selectively rupturable diaphragm means providing a fluid-tight rupturable seal across said conduit in the wall of said reservoir for releasing said electrolyte from said reservoir upon a rupture of said seal by a pressurization of the fluid by said capsule means, and battery plate stack means arranged to receive the electrolyte from said reservoir upon a rupture of said rupturable seal.

5. A battery as set forth in claim 4 wherein said cell stack means includes fluid-tight cell stack container formed integrally with said reservoir and sharing a common wall containing the fluid conduit therethrough between said reservoir and said stack means.

6. A battery as set forth in claim 4 wherein said capsule means includes a spiral hollow flexible tube.

7. A battery as set forth in claim 6 wherein said tube is an electrolyte resistant thin wall metal tube.

8. A battery as set forth in claim 7 wherein said metal is thick annealed nickel 200.

9. A battery as set forth in claim 4 wherein said capsule means includes an edge welded rectangular bladder.

10. A battery as set forth in claim 9 wherein said bladder is formed from electrolyte resistant metal sheets.

11. A battery as set forth in claim 10 wherein said metal sheets are composed of thick annealed nickel 200.

12. A battery as set forth in claim 6 wherein an axis of said spiral tube is perpendicular to a plane of said diaphragm.

13. A battery as set forth in claim 4 wherein said capsule means includes a hollow, thin wall flexible container and said selectively operable means includes a gas pressure generator means arranged to selectively introduce a pressurized gas into an interior of said container to expand said container to pressurize the electrolyte.

14. A battery as set forth in claim 13 wherein said pressure generator means includes an electrically operable gas generator and a pair of electrical energizing signal connecting leads connected to said gas generator through a wall of said reservoir through respective fluid-tight seals.

15. A battery as set for thin claim 14 wherein said container is a spiral flexible, thin wall metal tube.

16. A battery as set forth in claim 14 wherein said container is an edge welded rectangular bladder formed from electrolyte resistant metal sheets.

17. A battery as set forth in claim 15 wherein an axis of said spiral tube is perpendicular to a plane of said diaphragm.

18. An electrochemical cell as set forth in claim 1 wherein said capsule means includes a hollow, thin wall flexible container and said selectively operable means includes a gas pressure generator means arranged to selectively introduce a pressurized gas into an interior of said container to expand said container to pressurize the fluid.

19. An electrochemical cell as set forth in claim 18 wherein said container is an edge welded rectangular bladder.

20. An electrochemical cell as set forth in claim 19 wherein said bladder if formed from electrolyte resistant metal sheets.

* * * * *